(12) United States Patent
Tang et al.

(10) Patent No.: US 8,666,169 B2
(45) Date of Patent: Mar. 4, 2014

(54) FEATURE DESCRIPTORS

(75) Inventors: Feng Tang, Mountain View, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 13/279,940

(22) Filed: Oct. 24, 2011

(65) Prior Publication Data
US 2013/0101226 A1    Apr. 25, 2013

(51) Int. Cl.
*G06K 9/46* (2006.01)

(52) U.S. Cl.
USPC .......................................... 382/201; 382/190

(58) Field of Classification Search
USPC .................................. 382/190, 201
See application file for complete search history.

(56) References Cited

U.S. PATENT DOCUMENTS

| | | | |
|---|---|---|---|
| 2002/0079425 A1* | 6/2002 | Rhoads ...................... | 250/201.9 |
| 2006/0050965 A1* | 3/2006 | Chang et al. .................. | 382/199 |
| 2008/0310731 A1* | 12/2008 | Stojancic et al. ............. | 382/195 |
| 2009/0238460 A1* | 9/2009 | Funayama et al. ............ | 382/181 |
| 2009/0279741 A1* | 11/2009 | Susca et al. ................... | 382/107 |
| 2009/0324083 A1* | 12/2009 | Campbell et al. ............. | 382/190 |
| 2010/0124371 A1* | 5/2010 | Jiang et al. .................... | 382/162 |
| 2010/0310174 A1* | 12/2010 | Reznik .......................... | 382/190 |
| 2010/0331041 A1* | 12/2010 | Liao et al. ..................... | 455/556.1 |
| 2011/0142350 A1* | 6/2011 | Tang et al. .................... | 382/195 |
| 2011/0150324 A1* | 6/2011 | Ngan et al. .................... | 382/159 |
| 2011/0182483 A1* | 7/2011 | Du et al. ........................ | 382/117 |
| 2011/0299741 A1* | 12/2011 | Zhang et al. .................. | 382/190 |
| 2011/0299770 A1* | 12/2011 | Vaddadi et al. ............... | 382/165 |
| 2012/0140992 A1* | 6/2012 | Du et al. ........................ | 382/117 |
| 2012/0321175 A1* | 12/2012 | Hedau et al. .................. | 382/159 |
| 2013/0004079 A1* | 1/2013 | Yamada et al. ............... | 382/190 |
| 2013/0028519 A1* | 1/2013 | Zuniga et al. ................. | 382/195 |

FOREIGN PATENT DOCUMENTS

| KR | 20110068539 | | 6/2011 | |
|---|---|---|---|---|
| WO | WO 2010/021633 | * | 2/2010 | ............... G06T 7/00 |
| WO | WO2011061709 | | 5/2011 | |

OTHER PUBLICATIONS

Sivic, J.; Zisserman, A., "Efficient Visual Search for Objects in Videos," Proceedings of the IEEE, vol. 96, No. 4, pp. 548,566, Apr. 2008.*
Painter, et al., "Compression of Video Frame Patches for Temporal Feature Extraction," Retrieved from http://www.stanford.edu/~mamakar/mentorship/painter-wang-khalili.pdf, Viewed on Jun. 29, 2011, 5 pages.
Wagner, et al., "Real Time Detection and Tracking for Augmented Reality on Mobile Phones," IEEE Transactions on Visualization and Computer Graphics, vol. 16, No. 3, Published: May/Jun. 2010, pp. 355-368.

* cited by examiner

*Primary Examiner* — Stephen R Koziol
*Assistant Examiner* — Shaghayegh Azima

(57) ABSTRACT

Methods, devices, and systems for determining feature descriptors are provided. An example includes defining a plurality of anchor points within a patch of pixels in a particular area that includes a detected feature in an image, defining a first set of subpatches and calculating an intensity of each of the first set of subpatches, defining a second set of subpatches and calculating an intensity of each of the second set of subpatches, comparing the intensity of each of the second set of subpatches to the intensity of each of the first set of subpatches and if the intensity of a second set subpatch is higher than the intensity of a first set subpatch assign a binary value, otherwise assign an alternative binary value, and concatenating all the assigned binary values into a binary feature descriptor.

14 Claims, 5 Drawing Sheets

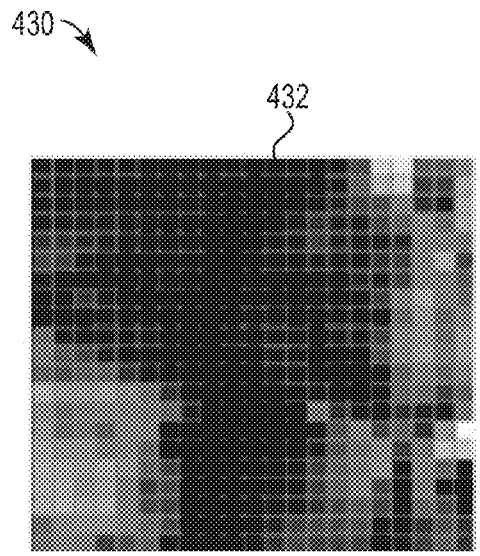
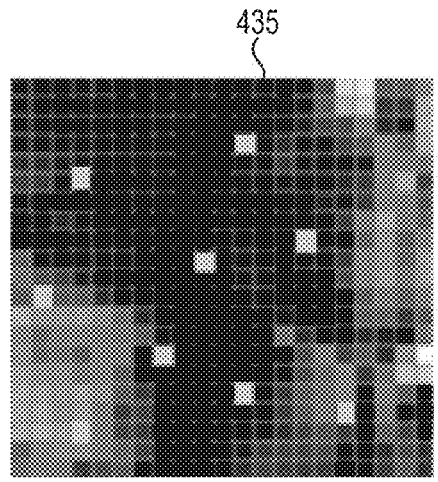
Fig. 4A
Fig. 4B
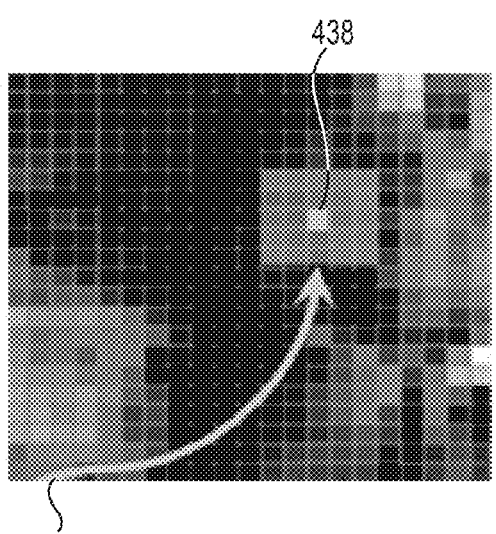
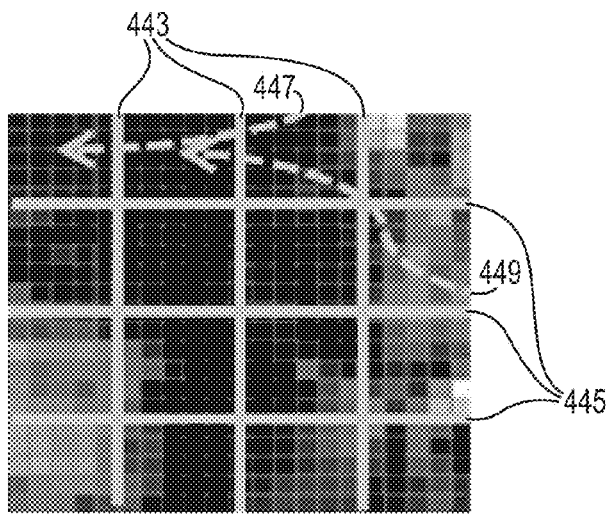
Fig. 4C
Fig. 4D

FEATURE DESCRIPTORS

BACKGROUND

In image processing and analysis, a local feature may be a piece of information that is relevant for a particular processing or analysis task. Determining a local feature may involve two components, such as a detector and a descriptor. The detector may identify a feature for further processing and analysis. The detector may detect and select a small subset of distinctive points (e.g., a number of pixels) from a whole image. The detector may attempt to select stable image points that are informative about image content.

The descriptor may characterize content of local patches, for instance, centered at the selected points. The descriptor may describe each local patch in a distinctive way having a feature descriptor with a lower data dimension than that of the local patch itself. The overall usefulness of the feature in processing or analysis may be affected by reliability and accuracy of the detection (e.g., localization) and/or distinctiveness of the description.

Compactly representing images and accurately finding corresponding regions between images are issues in computerized image and video processing, such with image recognition and tracking, among others. Although some approaches have been successful in image recognition and tracking, for example, these approaches may be difficult to use in mobile applications. For instance, these approaches may be computationally demanding, may require a large amount of storage (e.g., memory), and/or the storage requirement also may incur additional bandwidth consumption if network transmission is utilized.

BRIEF DESCRIPTION OF THE DRAWINGS

FIGS. 4A-4D illustrate an example of image analysis to determine feature descriptors according to the present disclosure.

DETAILED DESCRIPTION

Figure 1:
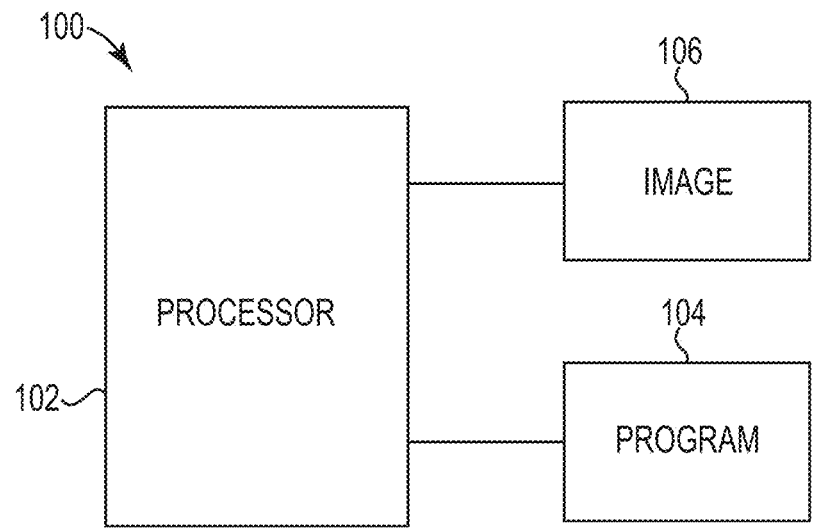
FIG. 1 is a block diagram conceptually illustrating an image analysis system according to the present disclosure.

The present disclosure describes examples of feature descriptors that are computationally efficient, compact in storage and transmission, and capable of robust feature matching. Such characteristics make these feature descriptors suitable, for instance, for computing devices that have low computation power, limited storage, and/or limited transmission bandwidth (e.g., for mobile applications, among others). The present disclosure can be utilized with numerous applications, for example, with applications such as image recognition, near-duplicate detection, and/or augmented reality, among others.

The feature descriptors described in the present disclosure are easily computed, enable fast feature distance computation, and are efficient in storage and transmission. The feature descriptors are computed by comparing intensity values of image patches such that integer addition and subtraction is performed. As such, the complexity of the computation can be reduced compared to other means for computing feature descriptors. Hence, these feature descriptors can be particularly suitable for use with a mobile and/or embedded device that, among other limitations, may not have floating point processing capability.

The resulting feature descriptor is a binary sequence of bits. Binary sequences can use two symbols (e.g., 0 or 1) as two alternative values, although binary values can be symbolized in many different ways, for example, to represent two different saved voltage levels. For example, a feature descriptor may have 256 dimensions and it may require only 256 bits (e.g., 32 bytes) for storage. The distance between two feature descriptors can, for example, be computed by using Hamming distance, which can be implemented efficiently using an exclusive OR (XOR) operator.

Examples of the present disclosure include methods, devices, and systems for calculation and application of the feature descriptors described herein, although the described feature descriptors are not limited to such applications. An example of a method of determining feature descriptors for images having a plurality of pixels includes utilizing a number of devices having image analysis functionality for defining a plurality of anchor points within a patch of pixels in a particular area that includes a detected feature in a first image, and defining a first set of subpatches, where each of the plurality of anchor points is included in a subpatch of pixels, and calculating an intensity of each of the first set of subpatches. The method includes defining a second set of subpatches that divides the patch of pixels in the particular area that includes the detected feature into a plurality of subpatches of pixels and calculating an intensity of each of the second set of subpatches. The intensity of each of the second set of subpatches is compared to the intensity of each of the first set of subpatches and if the intensity of a second set subpatch is higher than the intensity of a first set subpatch a binary value (e.g., the value of 1) is assigned, otherwise the alternative binary value (e.g., the value of 0) is assigned. Accordingly, a particular binary feature descriptor is determined by concatenating all the assigned binary values.

FIG. 1 is a block diagram conceptually illustrating an image analysis system according to the present disclosure. The image analysis can be implemented by a computer system 100 including an appropriately programmed processor 102. Any suitable computing or data processing environment can be used, including digital electronic circuitry (e.g., an application-specific integrated circuit (ASIC) or a digital signal processor (DSP)) and/or computer hardware, firmware, device driver, and/or software, among others. Functionalities of the blocks shown in FIG. 1 can be combined, for example, into a single data processing component. In some examples, the respective functionalities of each of the blocks can be performed by a set of multiple data processing components.

In the detailed description of the present disclosure, reference is made to the accompanying drawings that form a part hereof, and in which is shown by way of illustration how examples of how the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. Further, where appropriate, as used herein, "for example" should be understood as an abbreviation for "by way of example and not by way of limitation".

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

As illustrated in FIG. 1, a program 104 storing image analysis instructions is accessible by the processor 102. The program 104 is stored in a non-transitory storage medium that may be integral to the computer system 100 or may be located remotely and be accessible over a network, for example. Storage media suitable for tangibly embodying program instructions and data include all forms of computer-readable memory, including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM, among others.

The processor 102 further has access to an image 106, which may be stored in a memory or may be provided by a camera or some other imaging device. The image 106 is formed from a plurality of pixels and the computer system 100 is operable to execute analysis of individual and/or groups of pixels (e.g., patches and subpatches of pixels) as described in the present disclosure. For example, intensities (e.g., brightness) of the individual pixels can be determined by averaging the RGB values for the pixel, which is equal to a gray scale (e.g., monotonic) intensity. Intensities for the groups of pixels (e.g., the patches and subpatches of pixels) can, for example, be determined by averaging or summing the intensities of the pixels in each of the groups.

Figure 2:
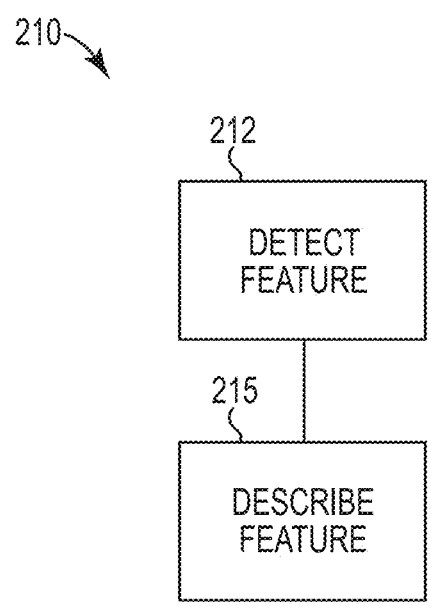
FIG. 2 is a block diagram illustrating analysis of an image according to the present disclosure.

FIG. 2 is a block diagram illustrating analysis of an image according to the present disclosure. FIG. 2 illustrates processes 210 included in the disclosed image analysis, including to detect features 212 in an image 106 and to describe the features 215.

A feature detector may detect and select a small subset of distinctive points (e.g., a number of pixels) as features from a whole image. The detector may attempt to select features that are both informative about image content and that are relatively stable regardless of changes in lighting, timing, and/or viewing angle between multiple images of the same object or scene. Corner detection is an example of an approach in image analysis used to select features. A corner can be an intersection of two edges, a point for which there are two dominant and different edge directions in a locality of a point, and/or a number of contiguous pixels that are significantly brighter or darker than the surrounding pixels (e.g., an isolated point of local intensity maximum or minimum), among other definitions. Other points of interest usable as features include line endings and/or a point on a curve where the curvature is a local maximum, among others. Accordingly, among many such examples, features can be selected (e.g., localized) at corner points (e.g., intersections) between relatively immobile objects in a scene or at local intensity extrema, where an intensity extremum is a point where a derivative of the intensity is zero at that point. Thus, to detect features 212 can include identifying a number of subsets of the pixels making up the image 106 that are relatively invariant in positioning and/or brightness intensity.

To describe features 215 has been performed using many approaches. However, some of these approaches may be computationally demanding, may require a large amount of storage (e.g., memory), and/or the storage requirement also may incur additional bandwidth consumption if network transmission is utilized. As presented in detail herein, the present disclosure includes methods, devices, and systems for calculation and application of feature descriptors that may mitigate these concerns.

Figure 3:
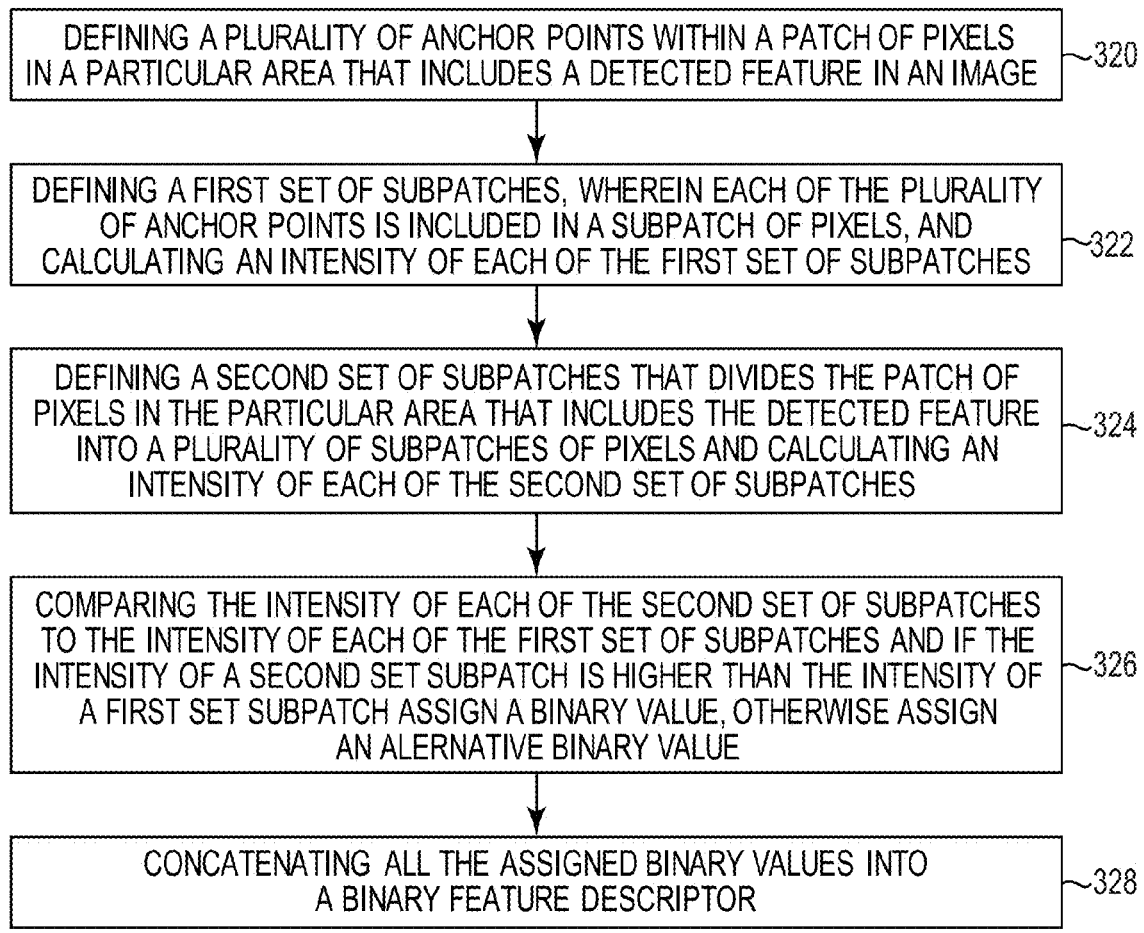
FIG. 3 is a block diagram illustrating an example of a method of determining feature descriptors for images having a plurality of pixels according to the present disclosure.

FIG. 3 is a block diagram illustrating an example of a method of determining feature descriptors for images having a plurality of pixels according to the present disclosure. Unless explicitly stated, the method examples described herein are not constrained to a particular order or sequence. Additionally, some of the described method examples, or elements thereof, can occur or be performed at the same, or substantially the same, point in time.

As described in the present disclosure, determining feature descriptors for images having a plurality of pixels includes utilizing a number of devices having image analysis functionality. The number of devices having image analysis functionality can be utilized for defining a plurality of anchor points within a patch of pixels in a particular area that includes a detected feature in an image, as shown in block 320 of FIG. 3. The number of apparatuses also can be utilized for defining a first set of subpatches, where each of the plurality of anchor points is included in a subpatch of pixels, and calculating an intensity of each of the first set of subpatches, as shown in block 322, and defining a second set of subpatches that divides the patch of pixels in the particular area that includes the detected feature into a plurality of subpatches of pixels and calculating an intensity of each of the second set of subpatches, as shown in block 324. As shown in block 326, the intensity of each of the second set of subpatches is compared to the intensity of each of the first set of subpatches and if the intensity of a second set subpatch is higher than the intensity of a first set subpatch a binary value (e.g., the value of 0) is assigned, otherwise an alternative binary value (e.g., the value of 1) is assigned. Accordingly, a particular binary feature descriptor is determined by concatenating all the assigned binary values, as shown in block 328.

FIGS. 4A-4D illustrate an example of image analysis to determine feature descriptors according to the present disclosure. The image analysis to determine the feature descriptors 430 illustrated in FIGS. 4A-4D is an example consistent with the teachings of the present disclosure, however, the example is not intended to be limiting. That is, the scope of the examples of the present disclosure includes other applications in which the disclosed methods, devices, and systems may be used. Therefore, the scope of the examples of the present disclosure should be determined with reference to the appended claims. Thus, the appended claims are hereby incorporated into the Detailed Description, with each claim standing on its own as a separate example.

FIG. 4A illustrates an example of an image patch 432 that has a patch of pixels in a particular area that includes a detected feature in an image. Although the image patch 432 shown in FIG. 4A is constructed with 21 pixels on each side, the present disclosure is not so limited. That is, for purposes of the present disclosure, an image patch can be constructed with any plurality of pixels on each side, which are not necessarily the same, and the image patch is not necessarily square or rectangular (e.g., the image patch can be substantially round, oval, polygonal, or any other geometric shape). In some examples, the detected feature (not shown) can be substantially centered in the middle of the image patch 432.

FIG. 4B illustrates an example of a plurality of anchor points 435 within the patch of pixels in the particular area that includes the detected feature in the image. As illustrated in FIG. 4B, the plurality of anchor points 435 are indicated as single bright pixels in positions where no bright pixels are shown in the image patch 432 of FIG. 4A. As such, by way of example, nine anchor points 435 are illustrated in FIG. 4B, although the present disclosure is not so limited. That is, for purposes of the present disclosure, an image patch can be constructed with any plurality anchor points, where the plurality of anchor points are not necessarily selected as single bright pixels in positions where no bright pixels are shown in the original image patch. In some examples, the plurality of anchor points can be randomly distributed within the image patch. In some examples, the number and positioning of anchor points can be maintained for use in analysis of and/or comparison to another image patch that includes a detected feature in the image.

FIG. 4C illustrates an example of a particular anchor point 438 within the patch of pixels in the particular area that includes the detected feature in the image. As illustrated in FIG. 4C, the particular anchor point 438 is located within a subpatch of pixels 440. Although the subpatch 440 shown in FIG. 4C is constructed with 5 pixels on each side, the present disclosure is not so limited. That is, for purposes of the present disclosure, a subpatch can be constructed with any plurality of pixels on each side, which are not necessarily the same, and the subpatch is not necessarily square or rectangular (e.g., the subpatch can be substantially round, oval, polygonal, or any other geometric shape). In some examples, the particular anchor point 438 can be substantially centered in the middle of the subpatch 440. In various examples, each of the anchor points (e.g., the plurality of anchor points 435 illustrated in FIG. 4B) can be located within a subpatch of pixels (e.g., as indicated at 440 in FIG. 4C) to define a first set of subpatches. In some examples, the plurality of subpatches can be at least partially overlapping.

FIG. 4D illustrates an example of an image patch (e.g., image patch 432 shown in FIG. 4A) that is divided into a second set of subpatches. In some examples, the second set of subpatches can cover the entire image patch, although the present disclosure is not so limited. The image patch can, for example, be divided horizontally by three evenly spaced lines 443 and also divided vertically by three evenly spaced lines 445 such that the image patch has 16 subpatches in the second set. Although each subpatch (e.g., subpatches 447 and 449) shown in FIG. 4D is constructed with 5 pixels on each side, the present disclosure is not so limited. That is, for purposes of the present disclosure, a subpatch can be constructed with any plurality of pixels on each side, which are not necessarily the same, and the subpatch is not necessarily square or rectangular (e.g., the subpatch can be substantially round, oval, polygonal, or any other geometric shape). In some examples, the second set of subpatches may have pixels in a number of spaces between the subpatches and/or the second set of subpatches may be at least partially overlapping.

For example, the 4 subpatches on each side of the image patch shown in FIG. 4D each have 5 pixels on each side of the subpatch, for a total of 20 pixels on each side in the subpatches, although the image patch has 21 pixels on each side. Such a discrepancy can occur because feature descriptors can be determined without using all the pixels in an image patch. In the present example, one row and one column of pixels in FIG. 4D are included as spaces between the second set of subpatches, although the present disclosure is not so limited.

As described in the present disclosure, an example of a particular feature descriptor can be determined as follows.

After an image patch that has a patch of pixels in a particular area that includes a detected feature in an image has been determined, anchor points are selected. That is, a set of K (e.g., 16) anchor points can be selected (e.g., randomly positioned) within an image patch (e.g., 41×41 pixels). These anchor points can, for example, be selected once and used for all the future descriptor determinations. For each anchor point, a subpatch from a first set of subpatches can be selected and an intensity of each of the subpatches in the first set of subpatches can be calculated (e.g., by calculating the average or the sum of the intensities of all the pixels in each subpatch). The image patch (e.g., the 41×41 pixels) can be divided into a second set of subpatches with M subpatches on a horizontal axis and N subpatches on a vertical axis to yield M×N subpatches in the second set. As such, in the present example, there are 4 subpatches on the horizontal axis and 4 subpatches on the vertical axis to yield 4×4=16 subpatches in the second set.

For example, the 4 subpatches on each side of the 41×41 pixel image patch could each have 5 pixels on each side of the subpatch, for a total of 20 pixels, although the image patch has 41 pixels on each side. As presented previously, such a discrepancy can occur because feature descriptors can be determined without using all the pixels in the image patch. In the present example, 21 rows and 21 columns of pixels are included as spaces between the second set of subpatches, although the present disclosure is not so limited. The rows and columns used as spaces between the second set of subpatches can be split into groupings and arrangements in any manner as long as the equivalent of the required number of spacer rows and columns is achieved.

The intensity of each of the second set of subpatches is compared to the intensity of each of the first set of subpatches (e.g., anchor point subpatches) and if the intensity of a second set subpatch is higher than the intensity of a first set subpatch a binary value (e.g., the values of 0 or 1) is assigned (e.g., outputted), otherwise the alternative binary value (e,g., the alternative value of 0 and 1) is assigned (e.g., outputted). As such, in the present example, comparison of each anchor point subpatch with each of the second set of subpatches assigns (e.g., outputs) 16 bits of 0 s and 1 s per anchor point subpatch. Accordingly, a particular binary feature descriptor can be determined by concatenating all the assigned binary values. As such, in the present example, the final dimension of the feature descriptor is calculated as K×M×N=16×4×4=256, which requires 32 bytes for storage. In some examples, concatenating all the assigned binary values can include concatenating all the assigned binary values in a predefined order.

In some examples of the present disclosure, defining the first set of subpatches can include defining each of the subpatches of pixels to be substantially equal in number of pixels (e.g., each of the subpatches having the same number of pixels on each side of a square or rectangle, although the present disclosure is not so limited) and defining each of the subpatches of pixels to be substantially smaller in number of pixels than the patch of pixels in the particular area that includes the detected feature (e.g., each of the subpatches having 5 pixels on each side, whereas the image patch has 41 pixels on each side, although the present disclosure is not so limited). Defining the second set of subpatches also can include defining each of the subpatches of pixels to be substantially equal in number of pixels (e.g., each of the subpatches having the same number of pixels on each side of a square or rectangle, although the present disclosure is not so limited) and defining each of the subpatches of pixels to be substantially smaller in number of pixels than the patch of pixels in the particular area that includes the detected feature (e.g., each of the subpatches having 5 pixels on each side, whereas the image patch has 41 pixels on each side, although the present disclosure is not so limited). In some examples, defining the first set of subpatches and defining the second set of subpatches can include defining each of the subpatches of pixels in the two sets to be substantially equal in number of pixels (e.g., each of the subpatches in the first set and the second set having 5 pixels on each side, although the present disclosure is not so limited). In some examples, defining the first set of subpatches and defining the second set of subpatches can include defining the two sets as at least partially non-overlapping.

Various examples of the present disclosure can include matching a first detected feature in a first image with a second detected feature in a second image, where the second detected feature has a second binary feature descriptor determined consistent with the method used to determine a first binary feature descriptor for the first image. The consistency of such a calculation can include defining in the same positions as in the first image a plurality of anchor points within a patch of pixels in a particular area in the second image that includes the second detected feature. In some examples, matching the first detected feature in the first image with the second detected feature in the second image can include determining a Hamming distance between the first binary feature descriptor and the second binary feature descriptor, where a small Hamming distance indicates a better match between the first detected feature and the second detected feature than a larger Hamming distance.

For example, after a feature descriptor has been determined for a feature in one image, the feature descriptor can be matched to another feature descriptor determined for a detected feature in another image. In some examples, a processor (e.g., a computation module) can be used to execute instructions stored in memory for this matching process to compute the distance between the two descriptors to identify whether the two features are likely the same feature or whether the two features are likely different features. A smaller distance indicates that the two features are more similar and that the two features are a potential match.

Because the feature descriptors are sequences of 0s and 1s, the Hamming distance can be calculated for comparison. The Hamming distance $d(x,y)$ between two vectors $x$, $y$ is the number of coefficients by which the two vectors differ. For example, $d(00111, 11001)=4$. This can be efficiently implemented by using XOR operator on the feature descriptor (e.g., counting the number of bits that are different).

As described herein, a local feature can be defined with two components, that is, a detector and a descriptor. A feature detector can first localize the features at a sparse set of distinctive image points (e.g., key points) in local image patches. The feature descriptor can then compute feature vectors from the local image patches centered at the distinctive image points. The feature vectors can then be matched individually for each patch or as a set for each image in various applications. Since the seminal work of scale invariant feature transform (SIFT), much work has been done on local feature implementations. However, a number of the local feature implementations require complicated computation, which can limit the application thereof in resource limited devices (e.g., mobile devices) because of the time, computing resources, and/or storage memory required for such computation, among other potential difficulties.

A feature extraction was performed on a Video Graphics Array (VGA) resolution (640×480) video taken from a webcam and matching was performed on an image of the same resolution to test the speed of such feature extraction and matching using feature descriptors as described in the present disclosure. The matching included determining a nearest feature descriptor as a match candidate and utilizing a RANdom SAmple Consensus (RANSAC) process to determine homography and reject outliers. Test results showed that using feature descriptors as described in the present disclosure yielded a time of 3.5 milliseconds for feature extraction, a time of 13.8 milliseconds for matching, which resulted in a total time of 17.3 milliseconds, as measured by a 2.8 gigahertz processor connected to 4 gigabytes of memory.

This total time for feature extraction and matching was approximately 10 times faster than a time measured for a device using more complicated computations, including a 64 dimensional floating point descriptor. Moreover, a feature descriptor as described in the present disclosure uses, for example, 256 bits (32 bytes) for storage, whereas the device using the more complicated computations uses 2048 bits (256 bytes) for storage, which is 8 times the storage space.

Figure 5:
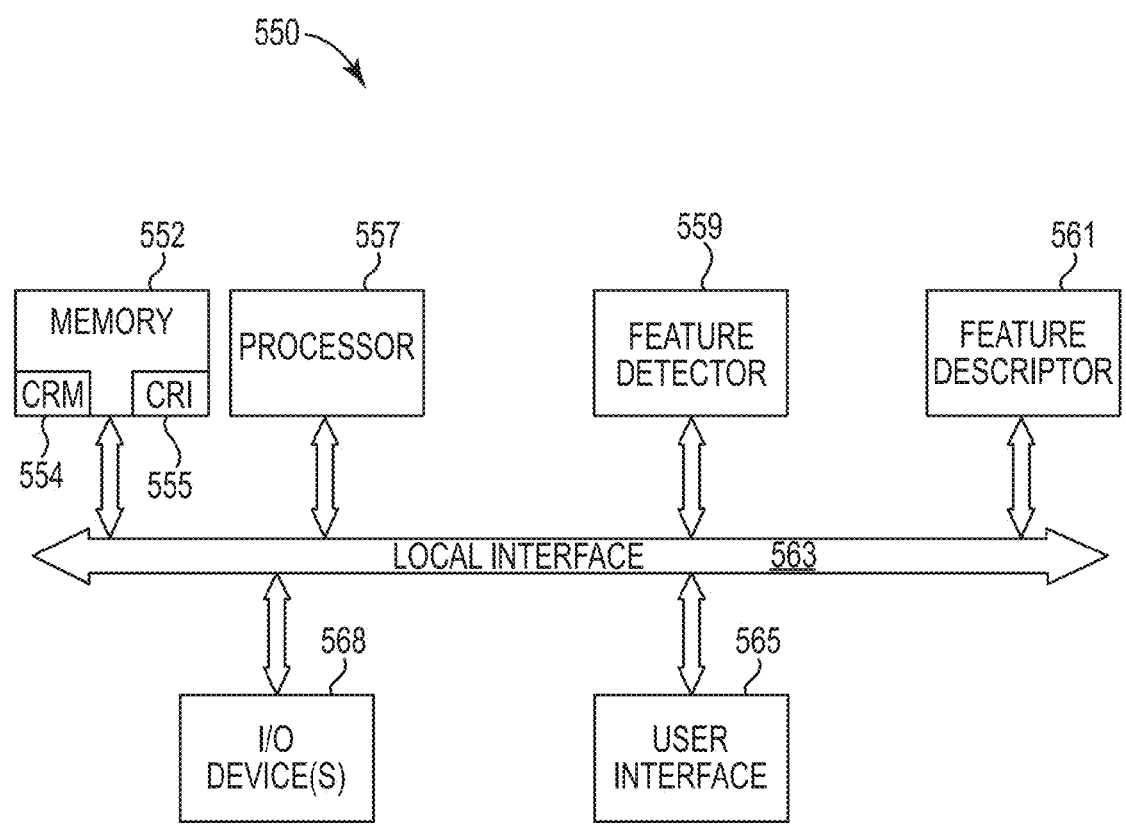
FIG. 5 is a block diagram illustrating an example of an image analysis system according to the present disclosure.

FIG. 5 is a block diagram illustrating an example of an image analysis system according to the present disclosure. The image analysis system 550 illustrated in FIG. 5 includes a number of directly and/or indirectly connected (e.g., interfaced) components. The system 550 can include a memory 552, where the memory can include a non-transitory computer readable medium 554 (CRM) and/or computer readable instructions 555 (CRI). The system can include a number of processors 557 that can be interfaced with each of the other components of the system 550. As described herein, the system 550 can, in some examples, include modules to effectuate the functionalities of a feature detector 559 and a feature descriptor 561, although these functionalities are capable of being combined into one module or can be split between more than two modules. The system 550 of FIG. 5 can include at least one I/O device 568 (e.g., including digital imaging devices for input of pixilated images) and a user interface 565. The system 550 also can include a local interface 563 to connect each of the just-described components, among others.

As presented in further detail elsewhere herein, the processor 557 can represent a plurality of processors associated with the system 550 (e.g., semiconductor based microprocessors and/or hardware processing resources in the form of an ASIC). The memory 552 can include any one of or a combination of volatile memory elements (e.g., RAM, among others) and nonvolatile memory elements (e.g., hard disk, flash memory, ROM, tape, among others).

The user interface 565 includes the components with which a user interacts with the system 550. The user interface 565 can include, for example, a keyboard, mouse, a touchscreen, and/or a display (e.g., a cathode ray tube (CRT) or a liquid crystal display (LCD) monitor). The one or more I/O devices 568 can be adapted to facilitate communications with other devices and can include a number of communication components (e.g., a modulator/demodulator (e.g., modem), a wireless (e.g., radio frequency (RF)) transceiver, a network card, among others) in addition to providing an interface for digital imaging devices for input of pixilated images.

The memory 552 can include various programs, for example, for an operating system, a printing component, an imaging component, a telecommunication component, and/or a network link, among others. The operating system can control execution of other programs and provide scheduling, input-output control, file and data management, memory management, and communication control and related services, among other functions. The printing component can be configured to translate content from user applications, such as word processing applications, file sharing applications, a network browser, imaging devices, and the like, accessible over the network link into print content that can be transmitted to an appropriate printing device for the generation of a hard copy printout. The network link can be a program that is configured to access and display network content (including images, among other functions). The network link can, for example, be used to access, display, and/or edit electronic documents (e.g., image or text content), browse the World Wide Web ("the web") over the Internet, among other functions.

The system 550 illustrated in FIG. 5 can determine feature descriptors for images, as described in the present disclosure. Accordingly, the system 550 can include a memory 552 to receive and store a first image comprising a plurality of pixels. A feature detector module 559 with access to a processor 557 can be used to detect a number of features at, for example, corners associated with a number of objects in the image. A feature descriptor module 561 with access to a processor 557 can, in various examples, be used to define a plurality of anchor points within a patch of pixels in a particular area that includes a detected feature in the first image, define a first set of subpatches, where each of the plurality of anchor points is included in a subpatch of pixels, and calculate an intensity of each of the first set of subpatches, and define a second set of subpatches that divides the patch of pixels in the particular area that includes the detected feature into a plurality of subpatches of pixels and calculate an intensity of each of the second set of subpatches.

In various examples, the feature descriptor module 561 and/or the processor 557 can compare the intensity of each of the second set of subpatches to the intensity of each of the first set of subpatches and if the intensity of a second set subpatch is higher than the intensity of a first set subpatch assign a binary value (e.g., the value of 1), otherwise assign an alternative binary value (e.g., the value of 0). In various examples, the feature descriptor module 561 and/or the processor 557 can concatenate all the assigned binary values into a first binary feature descriptor.

In various examples, the memory 552 can receive and store a second image including a plurality of pixels, the feature detector module 559 can detect a number of features at, for example, corners associated with a number of objects in the second image that are similar to the features detected in the first image, and the feature descriptor module 561 can determine a second binary feature descriptor. In some examples, the system can include a matching module (not shown) with access to a processor 557 to determine homography between the features detected in the first image and the features detected in the second image by comparison of the first binary feature descriptor with the second binary feature descriptor, whereas, in some examples the matching functionality can be performed by the feature descriptor module 561 and/or the processor 557.

Feature detection in combination with feature descriptors, as described in the present disclosure, can be implemented in a number of applications. As described herein, these feature descriptors are computationally efficient, compact in storage and transmission, and capable of robust feature matching. Such characteristics make these feature descriptors suitable, for instance, for computing devices that have low computation power, limited storage, and/or limited transmission bandwidth (e.g., for mobile applications, among others) for applications, for example, such as image recognition, near-duplicate detection, and/or augmented reality, among others. The applications presented herein are intended as examples of such implementation and are not limitations on the implementation thereof.

As described in the examples presented herein, matching the first detected feature in the first image to the second detected feature in the second image can, in various examples, include enabling a function selected from a group that includes: matching a number of features of a particular image with a number of features of a plurality of images saved in a database to determining potential matches to a number of particular images; and matching a number of features of a print image with a number of features of a plurality of dynamic media presentations saved in a database to enable video or audio play of a matched dynamic media presentation.

Printed materials such as books, magazines, reports, and marketing collateral, among others, often are created from content in digital form. While it is straightforward to include static content (e.g., text, photos, and illustrations) in such printed materials, to include dynamic media content (e.g., audio, video, 3-D models, and/or animation, among others) into these materials may be difficult. Thus, such dynamic media content may be omitted when prints are created from digital content. Moreover, the static content may lack any direct mapping to the more dynamic media content. Implementation of the present disclosure can create a link between the static content and the more dynamic media content.

An implementation of feature detection in combination with feature descriptors, as described in the present disclosure, can, for example, be an augmented photobook. Use of local features and matching with feature descriptors may accurately detect a link between a photograph (e.g., regardless of whether it is a digital image) in a photobook and a particular photographic image. For example, a user may take a digital picture (e.g., with a mobile communication device having a digital camera) of the photograph, and through the use of feature detection in combination with feature descriptors, as described in the present disclosure, a match with a frame of a corresponding video in a database can be found. In some examples, the corresponding video can be played (e.g., within a boundary of the photograph on a monitor of the mobile communication device having the digital camera) or on a monitor of another device that is connected by wire or wirelessly.

Multiple features can be detected in and multiple feature descriptors can be determined for, for example, the photograph in the photobook. Similarly, multiple features can be detected in and multiple feature descriptors can be determined for, for example, each frame of a plurality of videos in the database. Matching between the feature descriptors can be used to determine homography between a captured image (e.g., of the photograph in the photobook) and a database image, which, in various examples, can be in any number of photographs and/or in corresponding videos in the database).

An implementation of feature detection in combination with feature descriptors, as described in the present disclosure, also can, for example, be applied to near-duplicate image detection. That is, for a near-duplicate pair, many feature matches can be found based on comparison of feature descriptors. In contrast, for a non-duplicate pair, fewer matches of feature descriptors may be found and such matches may correspond to features associated with different objects in each image.

Another implementation of feature detection in combination with feature descriptors, as described in the present disclosure, can, for example, be applied to what can be termed "wail paper recognition". Wall paper recognition can, for example, use customizable wall decor with a plurality of images distributed thereon. Wall paper recognition can use local features and feature descriptors to recognize which image a digital camera is pointing at regardless of how a photograph of the image is acquired (e.g., regardless of whether an actual photograph of the image is taken and saved or a real-time image is registered on the view screen of the digital camera, among other possibilities).

Wall paper recognition can match the image at which the digital camera is pointed with a corresponding image saved in a memory database (e.g., of a poster with a plurality of images that can be affixed to the wall). Such a match can, for example, enable dynamic media content (e.g., video and/or audio) associated with a corresponding image to start playing. One example is a music wall where pointing a camera of a mobile device at one image representing a particular song or music album among a plurality of images (e.g., representing other songs or music albums) causes the matched song or music album to start playing.

Examples of the present disclosure may include methods, devices, and systems, including executable instructions and/or logic to facilitate image analysis and/or implementation of feature detection in combination with feature descriptors, which can be executed in connection with particular applications. Processing resources can include one or more processors able to access data stored in memory to execute the comparisons, actions, functions, etc., described herein. As used herein, "logic" is an alternative or additional processing resource to execute the comparisons, actions, functions, etc., described herein, which includes hardware (e.g., various forms of transistor logic, ASICs, etc.), as opposed to computer executable instructions (e.g., software, firmware, etc.) stored in memory and executable by a processor.

In a network of computing devices, a number of network devices can be networked together in a Local Area Network (LAN) and/or a Wide Area Network (WAN), a personal area network (PAN), and the Internet, among other networks, via routers, hubs, switches, and the like. As used herein, a network device (e.g., a device having processing and memory resources and/or logic that is connected to a network) can include a number of switches, routers, hubs, bridges, etc.

Figure 6:
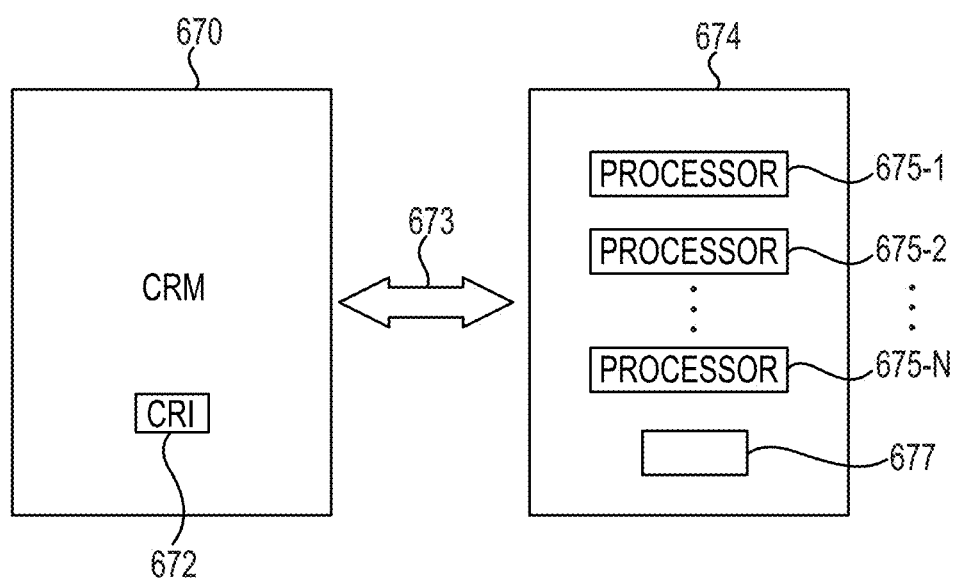
FIG. 6 is a block diagram illustrating an example of a computing device readable medium with processing resources for image analysis using feature descriptors according to the present disclosure.

FIG. 6 is a block diagram illustrating an example of a computing device readable medium (CRM) with processing resources for image analysis using feature descriptors according to the present disclosure. For example, the CRM 670 can be in communication via a communication path 673 with (e.g., operatively coupled to) a number of computing devices 674 having a number of processing resources 675-1, 675-2, . . . , 675-N (e.g., one or more processors). The CRM 670 can include computing device readable instructions (CRI) 672 to cause the number of computing devices 674 to, for example, perform image analysis and/or implementation of feature detection in combination with feature descriptors, which can be executed in connection with particular applications.

For example, as described in the present disclosure, a non-transitory computer readable medium can have computer-executable instructions stored thereon to determine feature descriptors for images. The computer readable instructions can be executable by a processor to, for example, define a plurality of anchor points within a patch of pixels in a particular area that includes a detected feature in an image, define a first set of subpatches, wherein each of the plurality of anchor points is included in a subpatch of pixels, and calculate an intensity of each of the first set of subpatches, and define a second set of subpatches that divides the patch of pixels in the particular area that includes the detected feature into a plurality of subpatches of pixels and calculate an intensity of each of the second set of subpatches.

The computer readable instructions also can be executable by a processor to, for example, compare the intensity of each of the second set of subpatches to the intensity of each of the first set of subpatches and if the intensity of a second set subpatch is higher than the intensity of a first set subpatch assign a binary value, otherwise assign the alternative binary value, and concatenate all the assigned binary values into a binary feature descriptor.

In some examples, the detected feature is defined to be substantially in a center of and the plurality of anchor points are randomly defined within the patch of pixels in the particular area that includes the detected feature. In some examples, a bit length of the binary feature descriptor is a number of subpatches in the first set multiplied by a number of subpatches in the second set.

The number of computing devices 674 can also include memory resources 677, and the processing resources 675-1, 675-2, . . . , 675-N can be coupled to these memory resources 677 in addition to those of the CRM 670. The CRM 670 can be in communication with the number of computing devices 674 having processing resources of more or fewer than 675-1, 675-2, . . . , 675-N. The number of computing devices 674 can be in communication with and/or receive from a tangible non-transitory CRM 670 storing a set of stored CRI 672 executable by one or more of the processing resources 675-1, 675-2, . . . , 675-N for image analysis and/or implementation of feature detection in combination with feature descriptors, which can be executed in connection with particular applications. The stored CRI 672 can be an installed program or an installation pack. With an installation pack, the memory, for example, can be a memory managed by a server such that the installation pack can be downloaded.

Processing resources 675-1, 675-2, . . . , 675-N can execute the CRI 672 to, for example, perform image analysis and/or implementation of feature detection in combination with feature descriptors, which can be executed in connection with particular applications. A non-transitory CRM (e.g., CRM 670), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), etc., as well as other types of CRM.

The non-transitory CRM 670 can be integral, or communicatively coupled, to a computing device, in either in a wired or wireless manner. For example, the non-transitory CRM 670 can be an internal memory, a portable memory, a portable disk, or a memory located internal to another computing resource (e.g., enabling CRI 672 to be downloaded over the Internet).

The CRM 670 can be in communication with the processing resources 675-1, 675-2, . . . , 675-N via the communication path 673. The communication path 673 can be local or remote to a machine associated with the processing resources 675-1, 675-2, . . . , 675-N. Examples of a local communication path 673 can include an electronic bus internal to a machine such as a computing device where the CRM 670 is one of volatile, non-volatile, fixed, and/or removable storage medium in communication with the processing resources 675-1, 675-2, . . . , 675-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 673 can be such that the CRM 670 is remote from the processing resources 675-1, 675-2, . . . , 675-N such as in the example of a network connection between the CRM 670 and the processing resources 675-1, 675-2, . . . , 675-N. That is, the communication path 673 can be a network connection. Examples of such a network connection can include a LAN, a WAN, a PAN, and the Internet, among others. In such examples, the CRM 670 may be associated with a first computing device and the processing resources 675-1, 675-2, . . . , 675-N may be associated with a second computing device.

It is to be understood that the above description has been made in an illustrative fashion, and not a restrictive one. Although specific examples for methods, devices, systems, computing devices, and instructions have been illustrated and described herein, other equivalent component arrangements, instructions, and/or device logic can be substituted for the specific examples shown herein.

What is claimed:

1. A method of determining feature descriptors for images having a plurality of pixels, comprising:
   utilizing a number of devices having image analysis functionality for:
   defining a plurality of anchor points within a patch of pixels in a particular area that comprises a first detected feature in a first image;
   defining a first set of subpatches, wherein each of the plurality of anchor points is comprised in a subpatch of pixels, and calculating an intensity of each of the first set of subpatches;
   defining a second set of subpatches that divides the patch of pixels in the particular area that comprises the detected feature into a plurality of subpatches of pixels and calculating an intensity of each of the second set of subpatches;
   comparing the intensity of each of the second set of subpatches to the intensity of each of the first set of subpatches and if the intensity of a second set subpatch is higher than the intensity of a first set subpatch assign a binary bit value, otherwise assign an alternative binary bit value; and
   concatenating all the assigned binary bit values into a first binary feature descriptor, wherein a bit length of the first binary feature descriptor is a number of subpatches in the first set multiplied by a number of subpatches in the second set.

2. The method of claim 1, wherein defining the first set of subpatches comprises defining each of the subpatches of pixels to be substantially equal in number of pixels and defining each of the subpatches of pixels to be substantially smaller in number of pixels than the patch of pixels in the particular area that comprises the detected feature.

3. The method of claim 1, wherein defining the second set of subpatches comprises defining each of the subpatches of pixels to be substantially equal in number of pixels and defining each of the subpatches of pixels to be substantially smaller in number of pixels than the patch of pixels in the particular area that comprises the detected feature.

4. The method of claim 1, wherein defining the first set of subpatches and defining the second set of subpatches comprises defining each of the subpatches of pixels in the two sets to be substantially equal in number of pixels.

5. The method of claim 1, wherein defining the first set of subpatches and defining the second set of subpatches comprises defining the two sets as at least partially non-overlapping.

6. The method of claim 1, wherein concatenating all the assigned binary bit values comprises concatenating all the assigned binary bit values in a predefined order.

7. The method of claim 1, further comprising matching the first detected feature in the first image with a second detected feature in a second image, wherein the second detected feature has a second binary feature descriptor determined consistent with the method used to determine the first binary feature descriptor for the first image, comprising defining in same positions as in the first image a plurality of anchor points within a patch of pixels in a particular area in the second image that comprises the second detected feature.

8. The method of claim 7, wherein matching comprises determining a Hamming distance between the first binary feature descriptor and the second binary feature descriptor, wherein a small Hamming distance indicates a better match between the first detected feature and the second detected feature than a larger Hamming distance.

9. The method of claim 7, wherein matching the first detected feature in the first image to the second detected feature in the second image comprises enabling a function selected from a group that comprises:
   matching a number of features of a particular image with a number of features of a plurality of images saved in a database to determining potential matches to a number of particular images; and
   matching a number of features of a print image with a number of features of a plurality of dynamic media presentations saved in a database to enable video or audio play of a matched dynamic media presentation.

10. A system to determine feature descriptors for images, comprising:
    a memory to receive and store a first image comprising a plurality of pixels;
    a feature detector module with access to a processor to detect a number of features at intersections of a number of objects in the image;
    a feature descriptor module with access to a processor to:
    define a plurality of anchor points within a patch of pixels in a particular area that comprises a detected feature in the first image;
    define a first set of subpatches, wherein each of the plurality of anchor points is comprised in a subpatch of pixels, and calculate an intensity of each of the first set of subpatches;
    define a second set of subpatches that divides the patch of pixels in the particular area that comprises the detected feature into a plurality of subpatches of pixels and calculate an intensity of each of the second set of subpatches;
    compare the intensity of each of the second set of subpatches to the intensity of each of the first set of subpatches and if the intensity of a second set subpatch is higher than the intensity of a first set subpatch assign a binary bit value, otherwise assign an alternative binary bit value; and
    concatenate all the assigned binary bit values into a first binary feature descriptor, wherein a bit length of the first binary feature descriptor is a number of subpatches in the first set multiplied by a number of subpatches in the second set.

11. The system of claim 10, wherein the memory receives and stores a second image comprising a plurality of pixels, the feature detector module detects a number of features at intersections of a number of objects in the second image that are similar to the features detected in the first image, and the feature descriptor module determines a second binary feature descriptor.

12. The system of claim 11, comprising a matching module with access to a processor to determine homography between the features detected in the first image and the features detected in the second image by comparison of the first binary feature descriptor with the second binary feature descriptor.

13. A non-transitory computer readable medium having computer-executable instructions stored thereon to determine feature descriptors for images, the computer-executable instructions comprising instructions executable by a processor to:

define a plurality of anchor points within a patch of pixels in a particular area that comprises a detected feature in an image;

define a first set of subpatches, wherein each of the plurality of anchor points is comprised in a subpatch of pixels, and calculate an intensity of each of the first set of subpatches;

define a second set of subpatches that divides the patch of pixels in the particular area that comprises the detected feature into a plurality of subpatches of pixels and calculate an intensity of each of the second set of subpatches;

compare the intensity of each of the second set of subpatches to the intensity of each of the first set of subpatches and if the intensity of a second set subpatch is higher than the intensity of a first set subpatch assign a binary bit value, otherwise assign an alternative binary bit value; and concatenate all the assigned binary bit values into a binary feature descriptor, wherein a bit length of the binary feature descriptor is a number of subpatches in the first set multiplied by a number of subpatches in the second set.

14. The medium of claim 13, wherein the detected feature is defined to be substantially in a center of and the plurality of anchor points are randomly defined within the patch of pixels in the particular area that comprises the detected feature.

* * * * *